(No Model.)
P. L. CLARK & E. W. YOUNG.
PNEUMATIC TIRE.
No. 539,353.                     Patented May 14, 1895.
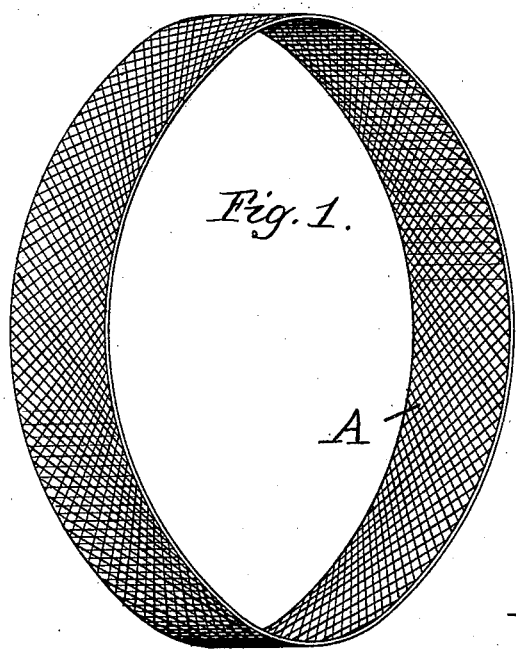
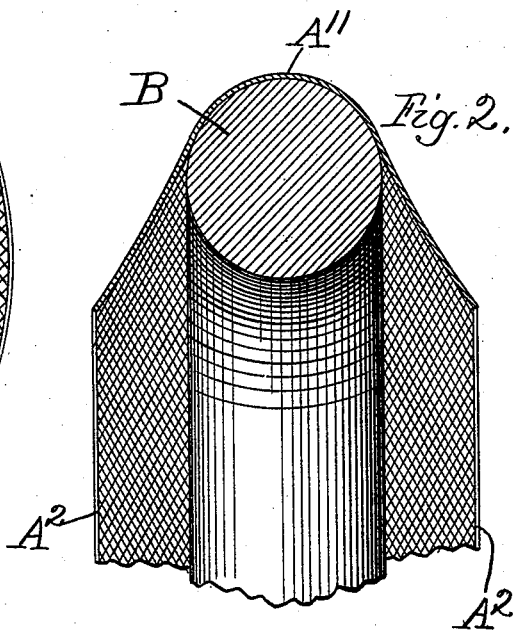
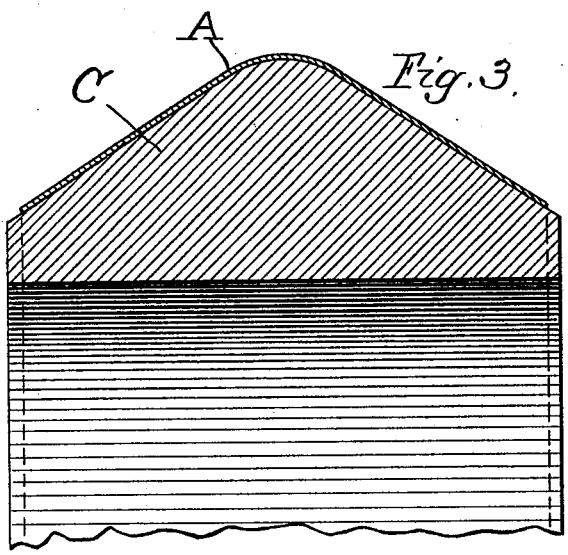
Witnesses.
Inventors,

UNITED STATES PATENT OFFICE.

PERCY L. CLARK AND ERNEST W. YOUNG, OF CHICAGO, ILLINOIS.

PNEUMATIC TIRE.

SPECIFICATION forming part of Letters Patent No. 539,353, dated May 14, 1895.

Application filed February 11, 1895. Serial No. 537,848. (No model.)

*To all whom it may concern:*

Be it known that we, PERCY L. CLARK and ERNEST W. YOUNG, citizens of the United States, residing at Chicago, county of Cook, and State of Illinois, have invented certain new and useful Improvements in Pneumatic Tires, which are fully set forth in the following specification, reference being had to the accompanying drawings, forming a part thereof.

This invention relates to the manufacture of tires for vehicle wheels of the class commonly termed "pneumatic," that is, such as are adapted to be inflated or to retain and restrain an inflatable core.

In the manufacture of such tires, it is very important that the thickness should be uniform, and that the wall should be of uniform pliability and extensibility, if at all extensible, since, otherwise, the inflation of the tire or of the core within will develop inequalities in the periphery, the thicker and stiffer or less extensible spots constituting either depressions or protrusions upon the surface greatly to the damage of the running quality of the tire. Tires of this class are almost uniformly made by the use of bias fabric,—that is to say, fabric whose threads do not run circumferentially around the wheel in one direction and circumferentially around the tire in the other, but obliquely around the tire in both directions. Such tires have been made by cutting bias strips from straight woven fabric, and since it is impossible to get fabric wide enough so that a single bias strip cut therefrom will be long enough to extend throughout the entire circumference of the tire, two or more such strips are usually employed and saturated with rubber and lapped to secure them together, and in this condition manipulated about a mandrel or mold form of some sort, according to the character of the tire to be made, and vulcanized on such mandrel. Great difficulty is experienced on account of the necessity of lapping the ends of the bias strips to make the continuous tire; and even if a long enough piece could be obtained to avoid all but one lap, still such lap would be a great objection, because if enough cement is employed to make the junction as strong as any other part, it is thereby rendered thicker than the rest to such an extent as to damage the tire; and if, on the other hand, to avoid this increased thickness, a minimum quantity of cement is employed, the junction is insecure and the tire is liable to separate at this point. A very common form of tires of this class is that which is made by wrapping the fabric about an annular mandrel circular in cross-section, permanently joining the lateral edges of the strip at the inner side of the mandrel, except for a short distance where an opening is made to withdraw the mandrel and insert the core. In this form of tire, also, it will be evident that the bias strips being placed on the mandrel and encompassing its outer circumference and lapped as required, must necessarily be so placed in normal condition on the mandrel,—that is, without being stretched circumferentially with respect to the mandrel, and it results from this that the lateral edges which are to meet at the inner circumference of the mandrel, are longer than that inner circumference, and the fabric is thereby of necessity condensed or compressed, and if it were not cut on the bias, would necessarily be crimped at the inner circumference where the edges are united. From all these circumstances it results that in closing up the mold about such mandrel, after the fabric and rubber have been properly applied, preparatory to vulcanizing the pressure with which the mold thus closes which is necessary to insure the proper conditions for a substantial tire, causes the fabric, which is nowhere stretched on the mandrel, to be frictionally engaged by the outer members of the mold at occasional points in the circumference, which causes a fold or loop of the fabric to be forced up at the outer circumference where the two members of the mold come together, making a protrusion from the circumference of the tire and destroying its efficiency, and thus wasting the material and labor expended in its construction; for this defect may not be discovered until after the vulcanizing process has been completed and the mold is opened. We have found that all these difficulties are removed if the fabric employed in the manufacture of such tires be an endless web or belt with its fibers bias, the diameter of such belt being a little less than the outer diameter of the mandrel or pulley on which the tire is to be formed, so that it is of necessity stretched at the middle point of its width in putting it onto the mandrel, which causes the lateral edges to be drawn in and partly to enwrap the mandrel in the mere process of stretching the endless band onto the latter, so that in completing the process of enwrapping the mandrel, when the tire is to be made closed up at the inner side,—as when an annular mandrel is employed, the fabric is not materially condensed or compressed or puckered at the edges, but, on the contrary, the edges meet at the inner circumference of the mandrel substantially at their normal length, neither stretched nor condensed. Not only are all laps thus avoided, but furthermore, the fabric is under such strong tension at the middle part of the width where it emcompasses the greatest circumference of the mandrel that the closing up of the mold about it does not pinch it up into folds, as described, and the result is a smooth tire of uniform tension and thickness throughout, without lapped seams liable to gap.

When the tire to be made is to be open at the inner circumference, being substantially a tire cover intended to have its edges engaged with the rim in a manner which is familiar, it will be formed in the manner which is customary for such tires,—upon a pulley instead of upon an annular mandrel,—the pulley being what is known as "cone-shaped," having its rim of greatest circumference at the middle of its width, and sloping off to the sides. Onto such a pulley, the endless bias web is stretched in the same manner as it is stretched onto the annular mandrel, the length of the endless band being such that when it is so stretched onto the pulley, the edges are drawn smoothly onto the face of the pulley, but not stretched, as the middle of the band is at the center of the higher part of the pulley.

In the drawings, Figure 1 represents an endless bias band of the character described. It may be made after the manner of braided whip-cord or whip-covers, a continuous tube being made whose diameter is that of the endless band desired, and from such large tube sections are cut off whose length is the necessary width of the band or belt to form the circumference of the tire or width of the tire-cover, according as the form is one or the other of those above referred to. Fig. 2 is a detail section made transversely through an annular mandrel, having the endless bias-fabric belt stretched onto it preparatory to the further steps in the process above described. Fig. 3 is a further detail section of a common pulley having the bias-fabric endless band stretched onto its periphery ready for the application of the rubber and vulcanization.

It will be understood that tires made in this manner will have the rubber applied and will be vulcanized in the customary manner,—that is to say, the fabric itself being saturated with the liquid rubber, or the plastic rubber being molded upon it, or both, the mandrel will remain in place within the tire thus formed and molded upon it during the process of vulcanization, and that such tires may be finished in other details as may be desired, the molds being adapted to form any sort of tread surface, or projections of any sort or shape, according to the method to be adopted in securing the tire to the rim of the wheel. Our invention has nothing to do with these details, and they are therefore not present in the drawings, but it is not to be understood on that account that they may not be present in tires made according to this invention, as in any other tires.

A is the endless bias band.

B is an annular mandrel on which the tire may be formed; the endless band A being stretched onto the mandrel, the middle A' of the width of the band being under strong tension when it is thus placed on the mandrel, and the edges $A^2$ $A^2$ being at normal tension and being drawn together somewhat by the stretching of the middle of the bias band, as shown.

C is a cone pulley, onto which the band A may be stretched to form an open tire or tire cover.

We claim—

1. A tire comprising an endless band of bias fabric without laps or seams suitably folded and shaped in transverse section: substantially as set forth.

2. The method of making pneumatic tires, which consists in forming an endless band of bias fabric without seams or laps, stretching the same onto a mandrel of greater circumference than such endless band, suitably laying the fabric to the mandrel and applying rubber thereto and vulcanizing the same on the mandrel: substantially as set forth.

In testimony whereof we have hereunto set our hands, in the presence of two witnesses, at Chicago, Illinois, this 5th day of January, 1895.

PERCY L. CLARK.
ERNEST W. YOUNG.

Witnesses:
CHAS. S. BURTON,
JEAN ELLIOTT.